United States Patent Office 2,770,567
Patented Nov. 13, 1956

2,770,567

INSECTICIDAL COMPOSITIONS OF ESTERS OF THIONOPHOSPHORIC ACID STABILIZED BY ORGANIC SULFATES OR SULFONATES

Karlfried Wedemeyer, Leverkusen-Bayerwerk, and Detlef Delfs, Leverkusen-Schlebusch, Germany, assignors to Farbenfabriken Bayer Aktiengesellschaft, Leverkusen, Germany, a corporation of Germany No Drawing. Application November 23, 1951,
Serial No. 257,964

7 Claims. (Cl. 167—22)

The present invention relates to stabilized non-aqueous insecticidal compositions containing as active ingredient insecticidal neutral esters of thionophosphoric acid.

In recent years a number of neutral esters of thionophosphoric acid have proved to possess an extraordinary insecticidal activity. These esters may be represented by the following general formula:

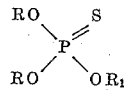

In this formula the two radicals R stand for alkyl, and $R_1$ for aryl or alkyl radicals bearing characteristic substituents. As typical representatives of this kind of compounds such may be mentioned as have become of practical importance: O.O-dimethyl O-p-nitrophenyl thionophosphate, O.O-diethyl O-p-nitrophenyl thionophosphate, O.O-dimethyl O-β-ethylmercapto ethyl thionophosphate, O.O-diethyl O-β-ethylmercapto ethyl thionophosphate, O.O-dimethyl O-β-methylmercapto ethyl thionophosphate, O.O-diethyl O-β-methylmercapto ethyl thionophosphate. Insecticidal esters of the above general formula and their mixtures show the tendency in the essential absence of water to lose in storing gradually some of their activity. This tendency is particularly pronounced in marketed mixtures containing—as it is frequently the case—besides the active ingredient an emulsifying agent of the polyglycol ether type. The decrease in activity is most probably due to an intramolecular rearrangement by which to some extent thiolphosphates of the general formula:

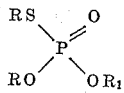

are formed.

We have now found that this tendency of the insecticidal neutral esters of thionophosphoric acid to undergo intramolecular rearrangement and thereby to lose in activity can be markedly reduced and the esters and their mixtures with emulsifiers of the mentioned kind be distinctly stabilized by adding a minor quantity of dialkyl sulfates or esters of organic sulfonic acids. The quantity to be added of these stabilizers is in general below 20 mol percent with respect to the quantity of insecticidal neutral thionophosphate present in the composition; mostly from about 0.5 to about 10 mol percent cause a stabilization sufficient for practical purposes. Of the compounds suitable as stabilizers are most readily available e. g. dimethyl sulfate, diethyl sulfate, methyl methane sulfonate, methyl p-toluene sulfonate, ethyl p-toluene sulfonate, allyl p-toluene sulfonate.

The following examples illustrate the present invention without, however, limiting it thereto:

*Example 1*

A mixture of 49 percent of O.O-dimethyl O-p-nitrophenyl thionophosphate, 49 percent of benzylhydroxy-diphenyl polyglycol ether (obtained by reacting 50 parts by weight of benzyl-p-hydroxy-diphenyl or benzyl-o-hydroxy-diphenyl or a technical mixture of both with 90 parts by weight of ethylene oxide in known manner) as emulsifier, and 2 percent of dimethyl sulfate showed after 42 days' standing at 40° C. an increase of 3.5 percent in O-methyl S-methyl O-p-nitrophenyl thiolphosphate.

*Example 2*

A mixture of 49 percent of O.O-dimethyl O-p-nitrophenyl thionophosphate, 49 percent of benzyl hydroxy-diphenyl polyglycol ether (obtained as described in Example 1) as emulsifier, and 2 percent of methyl p-toluene sulfonate showed after 42 days' standing at 40° C. an increase of 10.6 percent in O-methyl S-methyl O-p-nitrophenyl thiolphosphate.

*Example 3*

A mixture of 50 percent of O.O-dimethyl O-p-nitrophenyl thionophosphate and 50 percent of benzyl hydroxy-diphenyl polyglycol ether (obtained as described in Example 1) as emusifier, without addition of a stabilizer according to the present invention, showed after 42 days' standing at 40° C. an increase of 17.8 percent in O-methyl S-methyl O-p-nitrophenyl thiolphosphate.

*Example 4*

A mixture of 49 percent of O.O-dimethyl O-p-nitrophenyl thionophosphate, 49 percent of benzyl hydroxy-diphenyl polyglycol ether (obtained as described in Example 1) as emulsifier, and 2 percent of diethyl sulfate showed after 24 days' standing at 40° C. an increase of 0.4 percent in O-methyl S-methyl O-p-nitrophenyl thiolphosphate.

*Example 5*

A mixture of 49 percent of O.O-dimethyl O-p-nitrophenyl thionophosphate, 49 percent of benzyl hydroxy-diphenyl polyglycol ether (obtained as described in Example 1) as emulsifier, and 2 percent of allyl p-toluene sulfonate showed after 22 days' standing at 40° C. an increase of 4.6 percent in O-methyl S-methyl O-p-nitrophenyl thiolphosphate.

*Example 6*

A mixture of 49 percent of O.O-diethyl O-β-ethyl-mercapto ethyl thionophosphate, 49 percent of benzyl hydroxy-diphenyl polyglycol ether (obtained as described in Example 1) as emulsifier, and 2 percent of dimethyl sulfate showed after 68 days' standing at 40° C. applied as a 1 percent aqueous emulsion a 65 percent kill of *M. solanifolii* within 30 minutes, while the corresponding mixture under the same conditions, but without stabilizer, resulted only in 35 percent kill within 30 minutes.

Instead of dimethyl sulfate also diethyl sulfate or methyl p-toluene sulfonate can be used in this example.

We claim:

1. Stabilized non-aqueous insecticidal compositions containing as an active ingredient an insecticidal neutral ester of thionophosphoric acid of the following general formula:

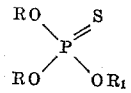

wherein R stands for lower alkyl and $R_1$ for a member of the group consisting of β-ethylmercapto lower alkyl and p-nitrophenyl, and as a stabilizer about 0.5 to about 20 mol percent, based on the number of mols of active ingredient of a compound having the following general formula:

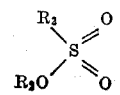

wherein $R_2$ stands for lower alkyl, and $R_3$ is a member selected from the group consisting of lower alkyl, O-lower alkyl and tolyl.

2. Stabilized non-aqueous insecticidal compositions containing as an active ingredient an insecticidal neutral ester of thionophosphoric acid of the following general formula:

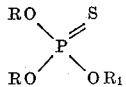

wherein R stands for alkyl having not more than 2 carbon atoms, and $R_1$ for a member of the group consisting of β-ethylmercapto alkyl, wherein the alkyl radical has not more than 2 carbon atoms and p-nitrophenyl, and as a stabilizer about 0.5 to about 20 mol percent, based on the number of mols of active ingredient of a compound having the following general formula:

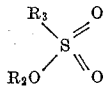

wherein $R_2$ stands for alkyl and $R_3$ is a member selected from the group consisting of alkyl, O-alkyl and tolyl, each alkyl having from 1–3 carbon atoms.

3. Stabilized non-aqueous insecticidal compositions containing as an active ingredient an insecticidal neutral ester of thionophosphoric of the following general formula:

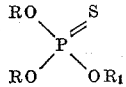

wherein R stanls for alkyl having not more than 2 carbon atoms and $R_1$ for a member of the group consisting of β-ethylmercapto alkyl, wherein the alkyl radical has not more than 2 carbon atoms and p-nitrophenyl, as an emulsifier a polyglycol ether, and as a stabilizer about 0.5 to about 20 mol percent, based on the number of mols of active ingredient of a compound having the following general formula:

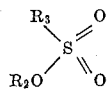

wherein $R_2$ stands for alkyl and $R_3$ is a member selected from the group consisting of alkyl, O-alkyl and tolyl, each alkyl having 1–3 carbon atoms.

4. Stabilized non-aqueous insecticidal compositions containing as an active ingredient an insecticidal neutral ester of thionophosphoric acid of the following general formula:

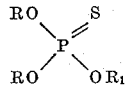

wherein R stands for alkyl having not more than 2 carbon atoms and $R_1$ for a member of the group consisting of β-ethylmercapto alkyl, wherein the alkyl radical has not more than 2 carbon atoms and p-nitrophenyl, as an emulsifier a polyglycol ether, and as a stabilizer about 0.5 to about 20 mol percent based on the number of mols of active ingredient present of a compound having the following general formula:

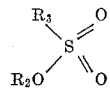

wherein $R_2$ stands for alkyl and $R_3$ is a member selected from the group consisting of alkyl, O-alkyl and tolyl, each alkyl having from 1–3 carbon atoms.

5. Stabilized non-aqueous insecticidal compositions containing as an active ingredient an insecticidal neutral ester of thionophosphoric acid of the following general formula:

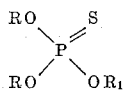

wherein R stands for alkyl having not more than 2 carbon atoms and $R_1$ for a member of the group consisting of β-ethylmercapto alkyl, wherein the alkyl radical has not more than 2 carbon atoms and p-nitrophenyl, as an emulsifier a polyglycol ether, and as a stabilizer from about 0.5 to about 10 mol percent with respect to the quantity of active ingredient present of a compound having the following general formula:

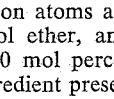

wherein $R_2$ stands for alkyl and $R_3$ is a member selected from the group consisting of alkyl, O-alkyl and tolyl, each alkyl having from 1–3 carbon atoms.

6. Stabilized non-aqueous insecticidal composition containing as active ingredient O.O-dimethyl O-p-nitrophenyl thionophosphate, as emulsifier a polyglycol ether of benzyl hydroxy-diphenyl and ethylene oxide, and as stabilizer about 0.5 to about 20 mol percent, based on the number of mols of the active ingredient, of methyl p-toluene sulfonate.

7. Stabilized non-aqueous insecticidal composition containing as active ingredient O.O-diethyl O-β-ethylmercapto ethyl thionophosphate, as emulsifier a polyglycol ether of benzyl hydroxy-diphenyl and ethylene oxide, and as stabilizer about 0.5 to about 20 mol percent, based on the number of mols of the active ingredient, of dimethyl sulfate.

References Cited in the file of this patent

UNITED STATES PATENTS

| | | |
|---|---|---|
| 2,486,658 | Kosolapoff | Nov. 1, 1949 |
| 2,583,744 | Schrader | Jan. 29, 1952 |

FOREIGN PATENTS

| | | |
|---|---|---|
| 652,336 | Great Britain | Apr. 18, 1951 |